United States Patent
Popp et al.

(10) Patent No.: US 7,430,463 B2
(45) Date of Patent: Sep. 30, 2008

(54) METHOD FOR MONITORING COMPONENTS OF THE DRIVE TRAIN OF A MOTOR VEHICLE AND FOR DIAGNOSING ERRORS IN THE SAME

(75) Inventors: Christian Popp, Kressbronn (DE);
Klaus Steinhauser, Kressbronn (DE);
Sven Diebold, Friedrichshafen (DE);
Manfred Scholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 682 days.

(21) Appl. No.: 10/511,481

(22) PCT Filed: Apr. 17, 2003

(86) PCT No.: PCT/EP03/04020

§ 371 (c)(1),
(2), (4) Date: Oct. 15, 2004

(87) PCT Pub. No.: WO03/091686

PCT Pub. Date: Nov. 6, 2003

(65) Prior Publication Data

US 2005/0187679 A1    Aug. 25, 2005

(30) Foreign Application Priority Data

Apr. 23, 2002 (DE) ............................... 102 18 050

(51) Int. Cl.
*G01M 17/00* (2006.01)

(52) U.S. Cl. ............................... 701/29; 701/30; 701/36; 340/425.5; 340/438; 340/439

(58) Field of Classification Search .................. 701/29, 701/30, 36; 340/425.5, 438, 439
See application file for complete search history.

(56) References Cited

U.S. PATENT DOCUMENTS

| 5,493,928 | A | 2/1996 | Mitchell et al. |
| 5,646,865 | A | 7/1997 | Alfaro et al. |
| 5,676,620 | A | 10/1997 | Ulm et al. |
| 5,844,411 | A | 12/1998 | Vogt |
| 6,088,631 | A | 7/2000 | Kuehn et al. |

(Continued)

FOREIGN PATENT DOCUMENTS

DE    37 35 184 A1    5/1989

(Continued)

*Primary Examiner*—Gertrude Arthur Jeangla
(74) *Attorney, Agent, or Firm*—Davis Bujold & Daniels, P.L.L.C.

(57) ABSTRACT

A method for monitoring and diagnosing errors of drive train components of a motor vehicle by monitoring a transmission route of a drive train control signal by reading an actual value of a monitored output signal at an output of the transmission route of the drive train control signal, determining by a calculation algorithm a nominal output value corresponding to the monitored output signal resulting from a check variable inserted into the transmission route before the output of the transmission route wherein the calculation algorithm is selected such that the nominal output value represents a value of the monitored output signal for the current value of the check variable, and performing a plausibility check of the monitored output signal by determining whether the actual output value is within an acceptable value of the nominal output value for the current value of the check variable.

9 Claims, 1 Drawing Sheet

U.S. PATENT DOCUMENTS

Figure 1:
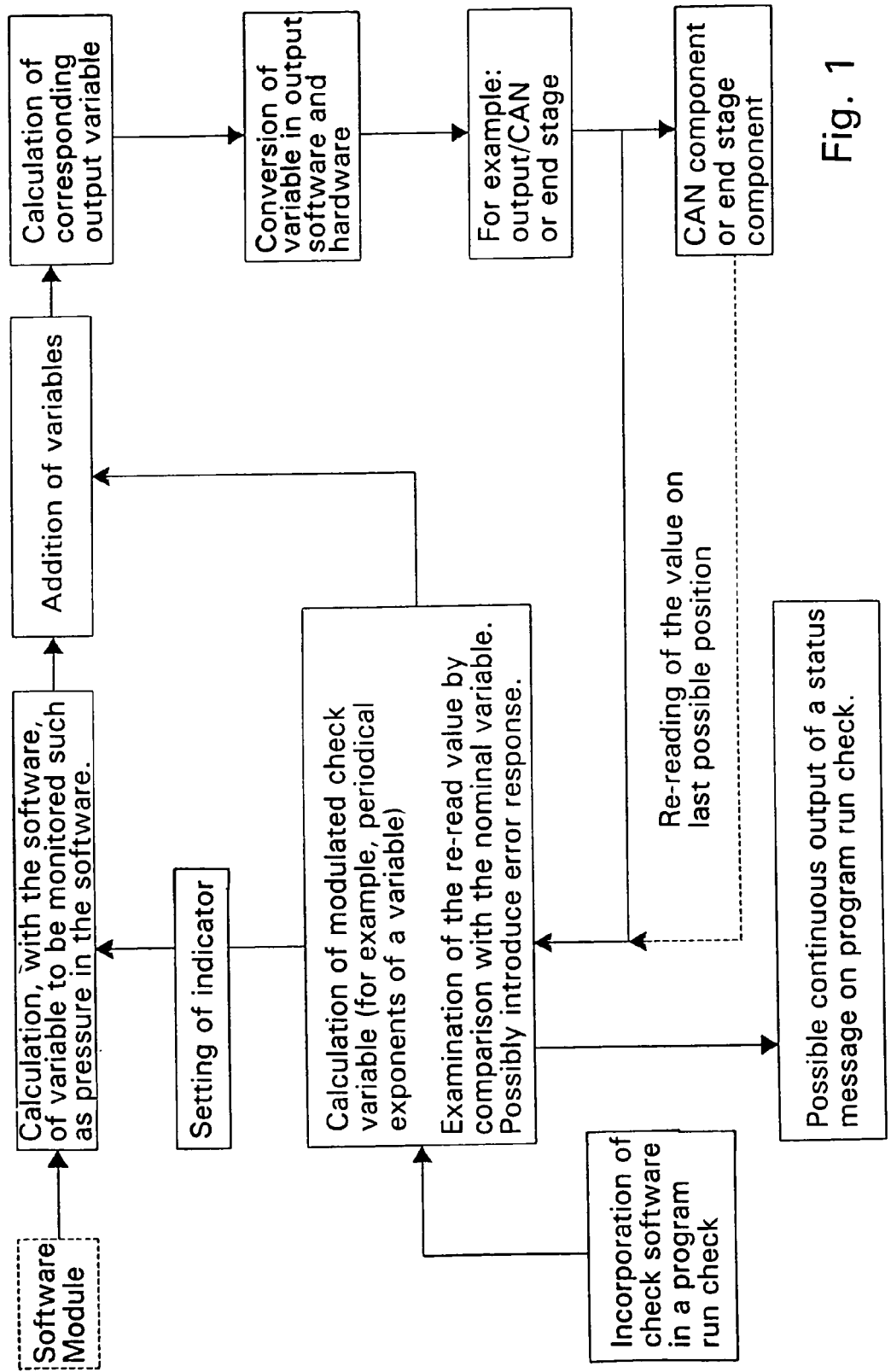

| | | |
|---|---|---|
| 6,507,918 B1 | 1/2003 | Last et al. |
| 6,577,935 B1 | 6/2003 | Petzold |
| 6,595,896 B1 | 7/2003 | Gierling |
| 6,688,999 B2 | 2/2004 | Sommer et al. |
| 2002/0023223 A1* | 2/2002 | Schmidt et al. ............. 713/187 |
| 2002/0095985 A1 | 7/2002 | Genise et al. |

FOREIGN PATENT DOCUMENTS

| | | |
|---|---|---|
| DE | 44 41 896 A1 | 5/1996 |
| DE | 197 12 445 A1 | 10/1998 |
| DE | 198 41 267 C1 | 3/2000 |
| DE | 198 50 881 A1 | 5/2000 |
| DE | 198 58 263 A1 | 6/2000 |
| DE | 199 57 269 A1 | 6/2000 |
| DE | 199 61 592 A1 | 6/2001 |
| DE | 101 08 267 A1 | 10/2001 |
| DE | 695 25 015 T2 | 7/2002 |
| DE | 101 11 830 A1 | 9/2002 |
| DE | 101 20 899 A1 | 10/2002 |
| EP | 1 180 673 A2 | 2/2002 |
| JP | 59145945 A | 8/1984 |
| JP | 62175230 A | 7/1987 |
| JP | 06249332 A | 9/1994 |
| JP | 07010023 A | 1/1995 |
| WO | WO 00/66917 | 11/2000 |

* cited by examiner

METHOD FOR MONITORING COMPONENTS OF THE DRIVE TRAIN OF A MOTOR VEHICLE AND FOR DIAGNOSING ERRORS IN THE SAME

According to the preamble of claim 1, the invention relates to a method for monitoring and error diagnosis of components of the drive train of a motor vehicle, which are controlled and/or regulated by means of signals generated by a calculation algorithm, especially for a transmission control.

Higher and higher requirements, due to the increasing complexity of automatic transmissions, automated manually operated transmissions, continuously variable transmissions and other components of the drive train of a motor vehicle, are placed on the diagnosis or monitoring system of the components. This is particularly the case in so-called shift-by-wire systems.

In the prior art different norms such as DIN 19250, IEC 61508 and DIN V 0801 for monitoring the components, have been advanced. This means high expenses for checking and monitoring software, since adequate safety and alternative functions have to be implemented.

The problem, which this invention is based, is to outline a method for monitoring and error diagnosis of components of the drive train of a motor vehicle which are controlled and/or regulated by means of signals generated by a calculation algorithm, especially for a transmission control, which overcomes the disadvantages of the prior art.

An effective monitoring system without high expenditures in software and hardware is to be implemented.

According to the invention this problem is solved by the features of claim 1. Other developments and advantages of the invention result from the sub-claims.

It is accordingly proposed to monitor at least the transmission routes of critical signals and/or output variables as indicator of the state of the system, since software and/or hardware errors result in transmission errors. The output values at the end of the monitoring routes are especially to be checked for plausibility.

According to the invention, one signal variable calculated by a function software or by a calculation algorithm is re-read and made plausible at least close to the last possible output position. To this end, according to the first alternative of the method introduced here, on the calculated nominal output value one variable is modulated which moves in the area having no or only a slight, effect on the actual output variable.

The modulated variable is preferably below the actual variables to be monitored having thus no effect upon the actual output variable or upon the system.

According to the invention, the calculated variable to be monitored is re-read on a position lying as far behind as possible in the signal flow. The re-read, modulated actual value is subsequently compared on the output position with the nominal value. Since the nominal value constantly changes, the re-read value also has to change constantly. It is thus ensured that on the way up to the output position no undesired change or no change has occurred as consequence of software and/or hardware errors. Adequate necessary filters or rounding offs or even outs, which could result by the timed cycles, have to be taken into account in the process of making plausible.

The advantage of this method is that the route of the calculated variable is directly checked without the additional cost of hardware and function software.

Within the scope of a second alternative of the inventive method, it is provided that the plausibility is checked by means of a checking software extending parallel with the function software.

For the process of making plausible is calculated by the checking software. One signal variable, which is calculated by a function software, is re-read, according to the invention, on the last possible output position and directly compared with the value calculated by the checking software, corresponding time offsets or rounding errors being taken into account.

According to the invention, the check value can be calculated in several ways:

On one hand, the same calculation algorithm (for example, interpolation in the characteristic field) can be used with the same data such as characteristic fields, characteristic lines, fixed values in the checking and output software. Errors in the calculation algorithm or in the data used are not detected here. Besides, when the same value is calculated over a long period of time, the signal route also is not checked during this time.

On the other hand, it can be provided that the calculation algorithm of the output value differs from the one of the check software. On one hand, within the scope of this inaccurate monitoring, the output value cannot be precisely checked but, on the other, software and hardware errors can be detected in the calculation algorithm. The data drawn for the calculation can be stored doubled. In this case both software and hardware errors (for example, bit tipper) can also be discovered.

One other alternative provides storing the check data in compressed form: the data can be generated, for example, by an adequate software and is activated during sintering of the memory module unit.

Signal variables are often calculated only in a specific situation. Outside this area, the value of the signal variables is often set to a maximum, a minimum, or zero. In such cases, it is unnecessary to carry out a costly checking operation according to the two already introduced alternatives of the inventive method.

It is, therefore, proposed in such a situation to set from the function software to the checking software a check indicator which signals that at the moment no calculation of the output value is taking place. But in the checking software, the output value is nevertheless re-read and directly compared with the fixed output variable such as zero. If the re-read value on the output interface now is not the same as the fixed check value, an error exists. An output value is generated which is not calculated by the function software.

The invention is explained in detail herebelow with the aid of the enclosed figure which represents a flow diagram of the first alternative of the inventive method.

According to the figure, a plausibility test of the signal transmission route is carried out for monitoring and error diagnosis of the components of the drive train of a motor vehicle.

A signal variable calculated by a function software, such as a value for the pressure, is re-read and made plausible on the last possible output position, for example, on a final stage module or on the last CAN module.

To implement this, a check variable is modulated with the variable to be monitored/calculated by the function software, while simultaneously setting a check indicator, which moves in an area which has no, or only a slight, effect on the output variable itself. The modulated check variable is advantageously calculated by periodical exponents of a variable.

Subsequently, the corresponding output variable is calculated from the variable to be monitored/modulated by the check variable which, according to the invention, is then re-read in the signal flow at the position lying as far back as possible. The re-read modulated actual value at the output position is then compared with the modulated nominal value. Since the nominal value constantly changes, the re-read value also has to constantly change.

It can thus be ensured that on the way up to the output position, no undesired change or no change has materialized due to software or hardware error. It is, in addition, inventively provided that needed filtering or roundings off or even outs of the variables, which could result by the timed cycles are taken into account in the process of making plausible.

According to the invention, the re-read value can be evaluated in several ways.

Pursuant to a first evaluation alternative, the re-read value is checked whether the difference of the successive check values exceeds a certain amount. Should this be the case, an error is ruled out.

It is directly possible to check the check value or the difference between the calculated value and the re-read value and/or compare the difference with the modulated offset.

According to the invention, different ways of making the invention plausible can advantageously be combined with each other. The check software, in addition, can also test several calculation functions for a plausible output value that acts upon one or more output interfaces.

The intensity of the analysis can be variously designed. Criteria for this are the probability of occurrence of error, the same as its effect on the safety of the driver, of the vehicle and of the corresponding units.

Within the scope of an especially advantageous implementation of the inventive method it can likewise be provided to test the check software in a program run check. Here the check software is tested to determine whether the checking function has developed without error.

The invention claimed is:

1. A method for monitoring and diagnosing errors of drive train components of a motor vehicle by monitoring a transmission route of a drive train control signal, comprising the steps of:
    reading an actual value of a monitored output signal at an output of the transmission route of the drive train control signal,
    determining by a calculation algorithm a nominal output value corresponding to the monitored output signal resulting from a check variable inserted into the transmission route before the output of the transmission route wherein the calculation algorithm is selected such that calculated nominal output value represents a corresponding value of the monitored output signal for the current value of the check variable when there are no errors in the drive train components, and
    performing a plausibility check of the monitored output signal by determining whether the actual output value is within an acceptable value of the nominal output value for the current value of the check variable.

2. The method for monitoring and diagnosing errors of drive train components of a motor vehicle by monitoring a transmission route of a drive train control signal according to claim 1, further comprising the steps of:
    modulating the current value of the check variable by a selected amount,
    determining a new actual value of the monitored output signal by re-reading the actual output value of the monitored output signal,
    determining a new nominal output value from the modulated value of the check variable, and
    performing a new plausibility check with the new nominal output value by determining whether the new actual output value for the current value of the modulated check variable is within an acceptable value of the new nominal output value for the modulated value of the check variable.

3. The method for monitoring and diagnosing errors of drive train components of a motor vehicle by monitoring a transmission route of a drive train control signal according to claim 2, wherein
    the value of the check variable is modulated by an amount selected to have an effect on a control function of the monitored output signal that is less than a predetermined limit.

4. The method for monitoring and diagnosing errors of drive train components of a motor vehicle by monitoring a transmission route of a drive train control signal according to claim 2, wherein the plausibility check includes determining whether successive differences between successive calculated output values for successive modulated values of the check variable exceed a specific preset amount.

5. The method for monitoring and diagnosing errors of drive train components of a motor vehicle according to claim 2, wherein:
    each nominal output value corresponding to a value of a modulated check variable is determined by a checking process operating in parallel with the calculation algorithm.

6. The method for monitoring and diagnosing errors of drive train components of a motor vehicle by monitoring a transmission route of a drive train control signal according to claim 5, wherein the checking process uses the same calculation algorithm and the same values of the check variable on which are based control and regulation of the components of the drive train.

7. The method for monitoring and diagnosing errors of drive train components of a motor vehicle according to claim 2, wherein:
    each nominal output value corresponding to a value of a check variable is precalculated and stored in a memory to be read during each plausibility check.

8. The method for monitoring and diagnosing errors of drive train components of a motor vehicle according to claim 7, wherein:
    the nominal output values are stored in compressed form.

9. The method for monitoring and diagnosing errors of drive train components of a motor vehicle by monitoring a transmission route of a drive train control signal according to claim 1, further comprising the steps of:
    at least a first monitored output signal is undergoing a plausibility check, and
    at least a first monitored output signal undergoes a plausibility check only during specified conditions and the specified conditions are not present,
    generating a check indicator in the calculation algorithm a check indicator to signal to the checking process a momentary non-calculation of a corresponding nominal output value,
    re-reading the check indicator in the checking process as the non-calculated corresponding nominal output value, and
    directly comparing the check indicator with a fixed output variable value.

* * * * *